J. E. BROWNE & H. H. COLSON.
AUTOMOBILE LAMP BRACKET.
APPLICATION FILED MAY 1, 1911.
1,022,463.
Patented Apr. 9, 1912.
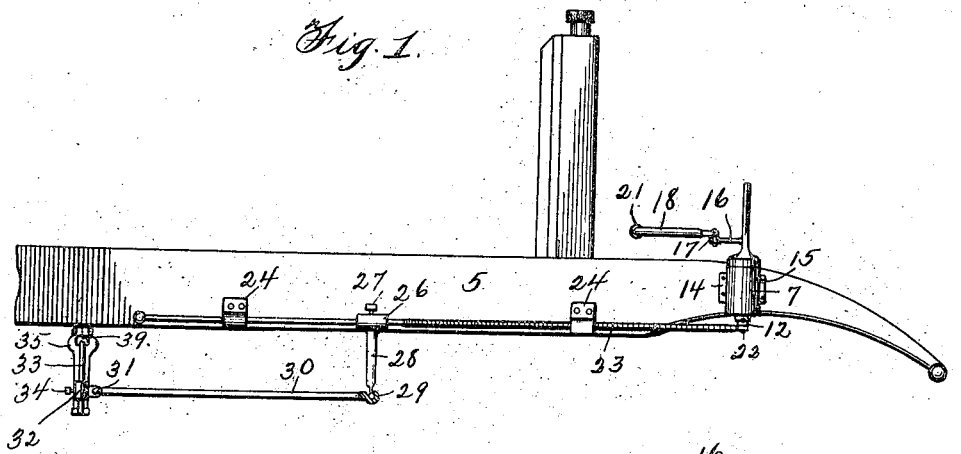
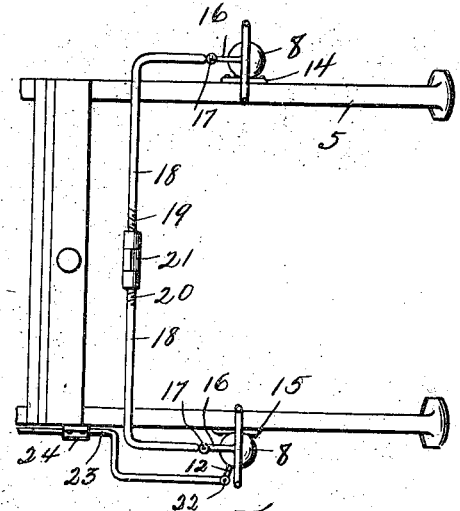
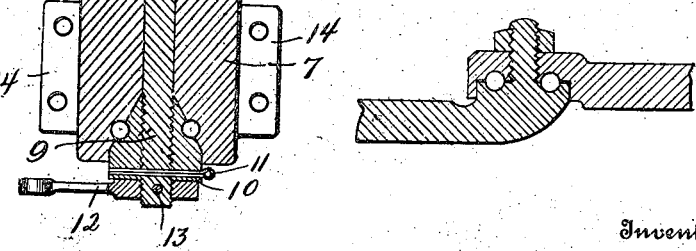
Witnesses
Anna M. Murray
Nevelle Lyles
Inventor
John E. Browne and
H. Herbert Colson,
By Shepherd & Campbell
Attorneys

UNITED STATES PATENT OFFICE.

JOHN E. BROWNE, OF BROOKLINE, AND HENRY HERBERT COLSON, OF EVERETT, MASSACHUSETTS.

AUTOMOBILE LAMP-BRACKET.

1,022,463.  Specification of Letters Patent.  Patented Apr. 9, 1912.

Application filed May 1, 1911. Serial No. 624,275.

*To all whom it may concern:*

Be it known that we, JOHN E. BROWNE and HENRY HERBERT COLSON, a subject of the King of England and a citizen of the United States, respectively, residing at Brookline, in the county of Norfolk and State of Massachusetts, and Everett, in the county of Middlesex and State of Massachusetts, respectively, have invented certain new and useful Improvements in Automobile Lamp-Brackets, of which the following is a specification.

This invention relates to automobile lamp brackets, the object of the invention being to provide brackets for the lamps connected with the steering gear of the automobile in such manner that the lamps are turned in unison with the front wheels of the automobile and capable of adjustment with relation to said steering gear so that the degree of movement of the lamp brackets may be varied or so that the lamps will not be moved when the steering gear is moved.

It is a well known fact that with the lamps fixed, the light is not thrown enough to the inside of the arc described by the road at a curve, to enable the driver to see any appreciable distance ahead, and it is the object of the present invention to remedy this by the structure such as above set forth.

Further objects and advantages of the invention will be set forth in the detailed description which now follows.

In the accompanying drawing, Figure 1 is a view in side elevation of a portion of an automobile chassis having the attachment applied thereto, Fig. 2 is a partial plan view of the parts shown in Fig. 1, Fig. 3 is a detail perspective view of an arm adapted to be attached to the steering mechanism, and Fig. 4 is a detail sectional view of the mounting of one of the lamp brackets.

Like numerals designate corresponding parts in all of the figures of the drawing.

Referring to the drawing, the numeral 5 designates the chassis of an automobile. The lamp brackets comprise base portions 7 upon which portions 8 have a rotative and preferably ball bearing mounting. A stem 9 extends from the portion 8 through the base 7 and has a cone 10 threaded upon its lower end that is fixed against accidental displacement by the cotter pin 11. A crank arm 12 is fixed upon the stem 9 by means of a pin 13. The bases 7 are provided with ears 14 perforated for the reception of fastening devices 15 by means of which the bases are secured to the sides of the chassis 5. The brackets 8 are of the usual form as far as their shape is concerned and are adapted to receive the acetylene gas lamps of the automobile. Projecting rearwardly from the portions 8 are crank arms 16. These crank arms are pivotally connected at 17 to rods 18, the ends of which are reversely threaded at 19 and 20 and engaged by a turn buckle 21. This turn buckle serves to adjust the brackets with relation to each other as will be readily understood.

Pivoted at 22 to the crank arm 12 is a rod 23 that is slidably mounted in keepers 24 secured to the chassis 5. This rod is encircled by a sleeve 26 that may be set at any desired position thereon by means of a set screw 27. Depending from the underside of the sleeve 26 is an arm 28 that has a universal joint connection 29 with a rod 30. The rod 30 is pivotally connected at 31 with a clip 32. This clip is slidably mounted upon a rod 33 and is adapted to be bound at any adjusted position thereon by means of a set screw 34. The rod 33 is carried by an arm 35, this arm having an angular recess 36 and being split at 37 to adapt it to be slipped over and then clamped, by means of a bolt 38, upon the shaft 39 that is a portion of the steering mechanism.

It will be seen that when partial rotation is imparted to the shaft 39 in the act of steering, a corresponding swinging movement is imparted to arm 35 and rod 33. This moves the link 30 either forwardly or rearwardly, according to the direction of movement of the shaft 39. This moves the rod 33 in the keepers 24 and through the connection of said rod with the crank arm 12, imparts a partial rotation to the portion 8 of the bracket, as will be readily understood. Since the portions 8 of the brackets are connected by the rods 18 and turn buckle 21, it follows that the movement of one bracket is transmitted to the other of said brackets. It is further apparent that if the set screw 34 be loosened and the clip 32 moved to a position where it is centered with relation to shaft 39, very little, if any movement of the lamp brackets will result when the shaft 39 moves, and that the degree of movement may be determined by sliding the clip 32 along the rod 33. In addition to thus adjusting the movement of the rod 23 and consequently the degree of movement of the portions 8 of the lamp brackets, the turn buckle 21 provides means for adjusting the position of these two brackets with relation to each other. This renders it possible to focus the light of both lamps upon the center of the road at any desired distance ahead.

From the foregoing description, it will be seen that simple and efficient means are provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

Having described our invention, what we claim is:

1. In a device of the character described, the combination with a movably mounted lamp bracket, of connections between the lamp bracket and the steering mechanism of an automobile, whereby said lamp bracket is moved in unison with said steering mechanism, and means for adjusting the degree of such movement, said adjusting means when moved to one position, substantially neutralizing such movement while still forming a positive connection between the steering mechanism and the lamp brackets.

2. In a device of the character described, the combination with a pair of lamp brackets mounted for rotation, of a connecting member between said lamp brackets, a longitudinally extending slidably mounted rod connected to one of said lamp brackets, an arm depending from and adjustable on said slidably mounted rod, a swinging arm moving in unison with the steering mechanism, a rod carried by said swinging arm, and a connection between the first named arm and said rod.

3. In a device of the character described, the combination with a pair of lamp brackets mounted for rotation, of a connecting member between said lamp brackets, a longitudinally extending slidably mounted rod connected to one of said lamp brackets, an arm depending from and adjustable on said slidably mounted rod, a swinging arm moving in unison with the steering mechanism, a rod carried by said swinging arm, and a connection between the first named arm and said rod, said connection comprising a clip slidably mounted upon said rod.

4. In a device of the character described, the combination with a pair of lamp brackets mounted for rotation, of a connecting member between said lamp brackets, a slidably mounted rod connected to one of said lamp brackets, an arm connected to said slidably mounted rod, a swinging arm moving in unison with the steering mechanism, a rod carried by said swinging arm, and a connection between the first named arm and said rod, said connection comprising a clip slidably mounted upon said rod, said rod being offset from and extending longitudinally of said swinging arm and said clip being movable upon said rod to a point where it is centered with relation to the axis from which said swinging arm swings.

In testimony whereof we affix our signatures in presence of two witnesses.

JOHN E. BROWNE.
H. HERBERT COLSON.

Witnesses:
J. W. BRITTON,
M. JOSEPH DOYLE.